US008246878B2

(12) United States Patent
Sun et al.

(10) Patent No.: US 8,246,878 B2
(45) Date of Patent: Aug. 21, 2012

(54) COMPOSITES COMPRISING A POLYMER AND A LAYERED COMPOUND AND METHODS OF PREPARING AND USING SAME

(75) Inventors: Luyi Sun, Pearland, TX (US); Jose Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 22 days.

(21) Appl. No.: 12/112,723

(22) Filed: Apr. 30, 2008

(65) Prior Publication Data

US 2009/0273110 A1 Nov. 5, 2009

(51) Int. Cl.
B29C 47/00 (2006.01)

(52) U.S. Cl. ..... 264/211; 264/108; 264/112; 264/171.1; 264/174.1; 264/210.6; 264/288.4

(58) Field of Classification Search ................ 264/108, 264/112, 171.1, 174.1, 210.6, 211, 288.4; 524/445–447
See application file for complete search history.

(56) References Cited

U.S. PATENT DOCUMENTS

| | | | |
|---|---|---|---|
| 2,178,104 A | 10/1939 | Kline et al. | |
| 4,029,876 A | 6/1977 | Beatty et al. | |
| 4,433,099 A | 2/1984 | Kupper et al. | |
| 4,777,210 A | 10/1988 | Sosa et al. | |
| 4,861,127 A | 8/1989 | Failes | |
| 5,514,734 A * | 5/1996 | Maxfield et al. | 523/204 |
| 5,559,162 A | 9/1996 | Meijer et al. | |
| 5,578,672 A | 11/1996 | Beall et al. | |
| 5,807,629 A * | 9/1998 | Elspass et al. | 428/323 |
| 5,883,173 A * | 3/1999 | Elspass et al. | 524/446 |
| 6,822,046 B2 | 11/2004 | Li et al. | |
| 7,179,873 B2 | 2/2007 | Reimers et al. | |
| 2002/0028870 A1 | 3/2002 | Lan et al. | |
| 2002/0037953 A1* | 3/2002 | Lan et al. | 524/445 |
| 2002/0161096 A1* | 10/2002 | Loontjens et al. | 524/445 |
| 2003/0021989 A1* | 1/2003 | Zhou et al. | 428/343 |
| 2005/0048276 A1* | 3/2005 | Wilson | 428/317.9 |
| 2005/0059769 A1 | 3/2005 | Chou et al. | |
| 2006/0074168 A1 | 4/2006 | Nelson et al. | |
| 2008/0004391 A1* | 1/2008 | Chan et al. | 524/445 |
| 2008/0044654 A1 | 2/2008 | Cadoret et al. | |

FOREIGN PATENT DOCUMENTS

WO  WO 2007/009200   *  1/2007

OTHER PUBLICATIONS

Goettler, Lloyd A., "Overview of property development in layered silicate polymer nanocomposites," Institute of Polymer Engineering, the University of Akron, Akron, Ohio, 2005, pp. 1980-1982, ANTEC.
Product properties, CX 5229, Dec. 2006, 1 page, Total Petrochemicals USA, Inc.
Product properties, Polystyrene 535, Jan. 2002, 1 page, Total Petrochemicals USA, Inc.

* cited by examiner

Primary Examiner — Khanh P Nguyen
Assistant Examiner — Carson Gross

(57) ABSTRACT

A method comprising extrusion compounding a styrenic polymer and a layered compound to produce a composite, and orienting the composite to produce an oriented composite wherein the layered compound comprises natural clay, synthetic clay, natural colloid, synthetic colloid, natural sol, synthetic sol, natural gel, synthetic gel, natural fumes, synthetic fumes, or combinations thereof. A method of preparing an oriented film comprising extrusion compounding a styrenic polymer and a clay to produce a nanocomposite, casting the nanocomposite into a film, and orienting the film in at least one direction.

10 Claims, 7 Drawing Sheets

COMPOSITES COMPRISING A POLYMER AND A LAYERED COMPOUND AND METHODS OF PREPARING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

This disclosure relates to composites comprising a polymer and a layered compound and methods of preparing and using same. More specifically, this disclosure relates to methods of exfoliating layered compounds to prepare polymer composites.

2. Background

Synthetic polymeric materials are widely used in the manufacturing of a variety of end-use articles ranging from medical devices to food containers. Nanocomposites comprised of polymeric materials and layered compounds represent a novel class of materials that often display desirable characteristics (e.g., improved mechanical and/or physical properties). The extent of incorporation of the layered compound into the polymer matrix influences the characteristics displayed by the nanocomposite. One of the challenges in preparing these materials is the difficulty associated with achieving a high degree of exfoliation of the layered compounds into the polymer matrix. Herein exfoliation refers to delamination of a layered materials resulting in the formation of disordered layers or sheets. Thus, it would be desirable to develop improved methods of exfoliating layered compounds into a polymer matrix.

SUMMARY

Disclosed herein is a method comprising extrusion compounding a styrenic polymer and a layered compound to produce a composite, and orienting the composite to produce an oriented composite wherein the layered compound comprises natural clay, synthetic clay, natural colloid, synthetic colloid, natural sol, synthetic sol, natural gel, synthetic gel, natural fumes, synthetic fumes, or combinations thereof.

Also disclosed herein is a method of preparing an oriented film comprising extrusion compounding a styrenic polymer and a clay to produce a nanocomposite, casting the nanocomposite into a film, and orienting the film in at least one direction.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
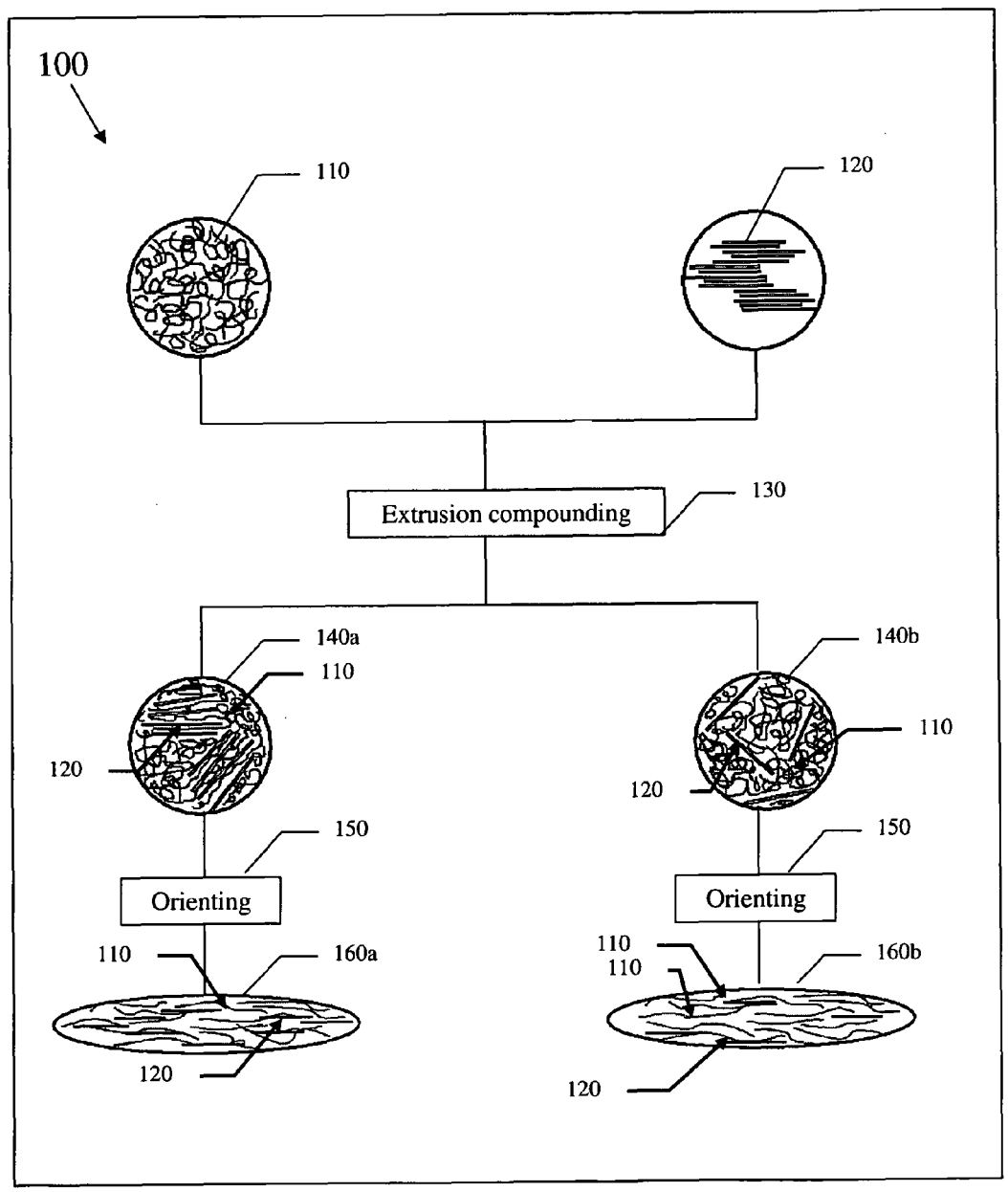
FIG. 1 is a schematic of a method of preparing a layered compound/polymer composite.

Disclosed herein are layered compound/polymer composites (LCPCs) comprising one or more layered compounds and one or more polymeric materials and methods of making and using same. In an embodiment, the LCPC is a composite material; alternatively the LCPC is a nanocomposite. Herein "composite materials" refer to materials which are made from two or more constituent materials (e.g., a layered compound and a polymeric material) with significantly different physical and/or chemical properties and which remain separate and distinct on a macroscopic level within the finished structure. Herein "nanocomposites" refer to materials that are created by introducing nanoparticulates, also termed filler materials (e.g., a layered compound) into a macroscopic material (e.g., a polymeric material) which is typically referred to as the matrix. In an embodiment, the LCPC comprises a nanocomposite having a layered filler material and a polymer matrix.

In an embodiment, the LCPC comprises a layered compound (e.g., a filler) such as for example natural and synthetic clay, sols, colloids, gels, fumes, and the like. Such compounds may comprise nanoparticulates which are small particles with at least one dimension less than 100 nanometers (nm). In an embodiment, the LCPC comprises a clay. Clays herein refer to aggregates of hydrous silicate particles either naturally occurring or synthetically produced, less than 4 micrometers (μm) in diameter and may consist of a variety of minerals rich in silicon and aluminum oxides and hydroxides which include variable amounts of other components such as alkali earth metals and water. Clays are most commonly formed by chemical weathering of silicate-bearing rocks, although some are formed by hydrothermal activity. These clays can be replicated in industrial chemical processes. Many types of clay have sheet-like (layered) structures and these layers are typically referred to as platelets. These platelets have a degree of flexibility with a thickness on the order of 1 nm and aspect ratios of 100 to 1500.

In some embodiments, the clay may be obtained from natural sources; alternatively the clay may comprise synthetic analogs of the compounds described herein. Any suitable synthetic analog and methods of preparing same may be used. For example, a synthetic clay may be prepared by the addition of acid to a sodium silicate or sodium aluminate solution (or mixtures thereof), or adding base to metal salt solutions, or by hydrolyzing metal alkoxides.

In some embodiments, the clay may be organophilic and such clays are typically referred to as organoclay. Organoclay is an organically modified silicate compound, derived from natural or synthetic clay. Organoclay can be produced from clays that are typically hydrophilic by ion exchange with an organic cation (e.g., alkylammonium ion), thus generating an organophilic surface. In other embodiments, the layered compounds used in the LCPC nanocomposite can be natural or synthetic compounds having a layered structure similar to clays. Examples of layered materials suitable for use in this disclosure include without limitation natural or synthetic bentonite, montmorillonite, hectorite, fluorohectorite, saponite, stevensite, nontronite, sauconite, glauconite, vermiculite, chlorite, mica, hydromica, muscovite, biotite, phlogopite, illite, talc, pyrophillite, sepiolite, attapulgite, palygorskite, berthierine, serpentine, kaolinite, dickite, nacrite, halloysite, allophane, imogolite, hydrotalcite, pyroaurite, calcite, wollastonite, or combinations thereof. Examples of organoclay suitable for use in this disclosure include without limitation CLOISITE 10A, CLOISITE 15A, and CLOISITE 30B, which are commercially available from Southern Clay Products, Inc. In an embodiment, the clay (e.g., CLOISITE 15A) has generally the properties set forth in Table 1.

TABLE 1

| Properties | Typical Value |
|---|---|
| % Moisture | Less than 2% |
| % Weight Loss on Ignition | 43% |
| Density, g/cc | 1.66 |

In an embodiment, the LCPC comprises a layered compound in the form of a colloid or colloidal dispersion. A "colloid" or "colloidal dispersion" is a type of homogenous mixture consisting of two separate phases: a dispersed phase and a continuous phase. In an embodiment, the LCPC comprises a colloidal dispersion comprising a dispersed phase comprising a filler material (e.g., a layered compound) and a continuous phase comprising an aqueous solution. In a colloid, the dispersed phase is made of tiny particles or droplets that are distributed evenly throughout the continuous phase. The size of the dispersed-phase particles is typically between 1 nm and 100 nm in at least one dimension. Examples of colloids suitable for use in this disclosure include without limitation colloidal borates, silicates, aluminates, phosphates, sulfates, sulfides and halides, or combinations thereof.

In an embodiment, the layered compound may be present in amount of from 0.1 weight percent (wt. %) to 50 wt. %, alternatively from 0.5 wt. % to 10 wt. %, or alternatively from 1 wt. % to 5 wt. % by weight of the LCPC.

In an embodiment, the LCPC comprises a polymer. The polymer may be present in the LCPC in an amount of from 50 wt. % to 99.9 wt. %, alternatively from 90 wt. % to 99.5 wt. %, alternatively from 95 wt. % to 99 wt. % based on the total weight of the LCPC. The polymer may be of any type compatible with the other components of the LCPC. In an embodiment, the polymer may be formed from one or more monomers, for example olefin monomers such as alpha-olefin monomers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include one or more monomers to produce homopolymers, copolymers, terpolymers, and the like, or polymer blends.

In an embodiment, the LCPC comprises a styrenic polymer (e.g., polystyrene), wherein the styrenic polymer may be a homopolymer or may optionally comprise one or more comonomers. Styrene, also known as vinyl benzene, ethyenylbenzene and phenylethene is an aromatic organic compound represented by the chemical formula $C_8H_8$. Styrene is widely commercially available and as used herein the term styrene includes a variety of substituted styrenes (e.g., alpha-methyl styrene), ring-substituted styrenes such as p-methylstyrene, disubstituted styrenes such as p-t-butyl styrene as well as unsubstituted styrenes.

In an embodiment, a styrenic polymer suitable for use in this disclosure has a melt flow as determined in accordance with ASTM D1238 of from 1.0 g/10 min to 30.0 g/10 min., alternatively from 1.5 g/10 min to 20.0 g/10 min., alternatively from 2.0 g/10 min to 15.0 g/10 min; a density as determined in accordance with ASTM D1505 of from 1.04 g/cc to 1.15 g/cc, alternatively from 1.05 g/cc to 1.10 g/cc, alternatively from 1.05 g/cc to 1.07 g/cc, a Vicat softening point as determined in accordance with ASTM D1525 of from 227° F. to 180° F., alternatively from 224° F. to 200° F., alternatively from 220° F. to 200° F.; and a tensile stryrenic determined in accordance with ASTM D638 of from 5800 psi to 7800 psi. Examples of styrenic polymers suitable for use in this disclosure include without limitation CX5229 and PS535, which are polystyrenes commercially available from Total Petrochemicals USA, Inc. In an embodiment, the styrenic polymer (e.g., CX5229) has generally the properties set forth in Table 2.

TABLE 2

| | Typical Value | Test Method |
|---|---|---|
| Physical Properties | | |
| Melt Flow, 200/5.0 g/10 m | 3.0 | D1238 |
| Tensile Properties | | |
| Strength, psi | 7,300 | D638 |
| Modulus, psi ($10^5$) | 4.3 | D638 |
| Flexular Properties | | |
| Strength, psi | 14,000 | D790 |
| Modulus, psi ($10^5$) | 4.7 | D790 |
| Thermal Properties | | |
| Vicat Softening, ° F. | 223 | D1525 |

In an embodiment, the styrenic polymer is present in an amount of from 50.0 wt. % to 99.9 wt. % by total weight of the LCPC, alternatively from 90 wt. % to 99.5 wt. %, alternatively from 90 wt. % to 99 wt. %. In an embodiment, the styrenic polymer comprises the balance of the LCPC when other ingredients are accounted for.

In some embodiments, the styrenic polymer may further comprise a comonomer which when polymerized with the styrene forms a styrenic copolymer. Examples of such comonomers may include for example and without limitation α-methylstyrene; halogenated styrenes; alkylated styrenes; acrylonitrile; esters of (meth)acrylic acid with alcohols having from 1 to 8 carbons; N-vinyl compounds such as vinylcarbazole, maleic anhydride; compounds which contain two polymerizable double bonds such as for example and without limitation divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in the styrenic polymer in an amount ranging from 1 wt. % to 99.9 wt. % by total weight of the LCPC, alternatively from 1 wt. % to 90 wt. %, and further alternatively from 1 wt. % to 50 wt. %.

In an embodiment, the polymer comprises a thermoplastic material. Herein a thermoplastic material refers to a plastic that melts to a liquid when heated and freezes to from a brittle and glassy state when cooled sufficiently. Examples of thermoplastic materials include without limitation acrylonitrile butadiene styrene, celluloid, cellulose acetate, ethylene vinyl acetate, ethylene vinyl alcohol, fluoroplastics, ionomers, polyacetal, polyacrylates, polyacrylonitrile, polyamide, polyamide-imide, polyaryletherketone, polybutadiene, polybutylene, polybutylene terephthalate, polychlorotrifluoroethylene, polyethylene terephthalate, polycyclohexylene dimethylene terephthalate, polycarbonate, polyhydroxyalkanoates, polyketone, polyester, polyethylene, polyethereetherketone, polyetherimide, polyetheresulfone, polyethylenechlorinate, polyimide, polylactic acid, polymethylpentene, polyphenylene oxide, polyphenylene sulfide, polyphthalamide, polypropylene, polysulfone, polyvinyl chloride, polyvinylidene chloride, and combinations thereof.

In an embodiment, the polymer comprises an elastomeric phase that is embedded in a polymer matrix. For example, the polymer may comprise a styrenic polymer having a conjugated diene monomer as the elastomer. Examples of suitable conjugated diene monomers include without limitation 1,3-butadiene, 2-methyl-1,3-butadiene, 2 chloro-1,3 butadiene, 2-methyl-1,3-butadiene, and 2 chloro-1,3-butadiene. Alternatively, the thermoplastic comprises a styrenic polymer having an aliphatic conjugated diene monomer as the elastomer. Without limitation, examples of suitable aliphatic conjugated diene monomers include $C_4$ to $C_9$ dienes such as butadiene monomers. Blends or copolymers of the diene monomers may also be used. Examples of thermoplastic polymers include without limitation acrylonitrile butadiene styrene (ABS), high impact polystyrene (HIPS), methyl methacrylate butadiene styrene (MBS), and the like.

The remainder of the disclosure will focus on the use of a styrenic polymer as the polymeric material, although it is to be understood that additional polymeric materials of the type described herein are contemplated.

In an embodiment, the LCPC may also comprise additives as deemed necessary to impart desired physical properties, such as increased gloss. Examples of additives include without limitation chain transfer agents, talc, antioxidants, UV stabilizers, and the like. The aforementioned additives may be used either singularly or in combination to form various formulations of the composition. For example, stabilizers or stabilization agents may be employed to help protect the polymeric composition from degradation due to exposure to excessive temperatures and/or ultraviolet light. In an embodiment, the styrenic polymer is foamed using any blowing agent known to one of ordinary skill in the art.

These additives may be included in amounts effective to impart the desired properties. Effective additive amounts and processes for inclusion of these additives to polymeric compositions may be determined by one skilled in the art with the aid of this disclosure. For example, one or more additives may be added after recovery of the LCPC, for example during compounding such as pelletization. Alternatively or additionally to, the inclusion of such additives in the styrenic polymer component of the LCPCs, such additives may be added during formation of the LCPC or to one or more other components of the LCPC.

In an embodiment, the polymer (e.g., styrenic polymer) may be prepared using any suitable technique. In an embodiment, the production of the styrenic polymer employs at least one polymerization initiator. Such initiators may function as a source of free radicals to enable the polymerization of styrene. In an embodiment, any initiator capable of free radical formation that facilitates the polymerization of styrene may be employed. Such initiators include by way of example and without limitation organic peroxides. Examples of organic peroxides useful for polymerization initiation include without limitation diacyl peroxides, peroxydicarbonates, monoperoxycarbonates, peroxyketals, peroxyesters, dialkyl peroxides, hydroperoxides or combinations thereof.

In an embodiment, the initiator level in the reaction is given in terms of the active oxygen in parts per million (ppm). In an embodiment, the level of active oxygen level in the disclosed reactions for the production of the LCPC is from 20 ppm to 80 ppm, alternatively from 20 ppm to 60 ppm, alternatively from 30 ppm to 60 ppm. The selection of initiator and effective amount will depend on numerous factors (e.g., temperature, reaction time) and can be chosen by one skilled in the art with the aid of this disclosure to meet the desired needs of the process. Polymerization initiators and their effective amounts have been described in U.S. Pat. Nos. 6,822,046; 4,861,127; 5,559,162; 4,433,099 and 7,179,873 each of which is incorporated by reference herein in its entirety.

In an embodiment, a method for production of the styrenic polymer comprises contacting styrene monomer and other components under reaction conditions suitable for the polymerization of the monomer. The polymerization reaction to form the styrenic polymer may be carried out in a solution or mass polymerization process. Mass polymerization, also known as bulk polymerization refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The polymerization process can be either batch or continuous. In an embodiment, the polymerization reaction may be carried out using a continuous production process in a polymerization apparatus comprising a single reactor or a plurality of reactors. For example, the polymeric composition can be prepared using an upflow reactor. Reactors and conditions for the production of a polymeric composition are disclosed in U.S. Pat. No. 4,777,210, which is incorporated by reference herein in its entirety.

The temperature ranges useful with the process of the present disclosure can be selected to be consistent with the operational characteristics of the equipment used to perform the polymerization. In one embodiment, the temperature range for the polymerization can be from 90° C. to 240° C. In another embodiment, the temperature range for the polymerization can be from 100° C. to 180° C. In yet another embodiment, the polymerization reaction may be carried out in a plurality of reactors with each reactor having an optimum temperature range. For example, the polymerization reaction may be carried out in a reactor system employing a first and second polymerization reactors that are either continuously stirred tank reactors (CSTR) or plug-flow reactors. In an embodiment, a polymerization reactor for the production of a styrenic copolymer of the type disclosed herein comprising a plurality of reactors may have the first reactor (e.g., a CSTR), also known as the prepolymerization reactor, operated in the temperature range of from 90° C. to 135° C. while the second reactor (e.g., CSTR or plug flow) may be operated in the range of from 100° C. to 165° C.

The polymerized product effluent from the first reactor may be referred to herein as the prepolymer. When the prepolymer reaches the desired conversion, it may be passed through a heating device into a second reactor for further polymerization. The polymerized product effluent from the second reactor may be further processed as described in detail in the literature. Upon completion of the polymerization reaction, a styrenic polymer is recovered and subsequently processed, for example devolatized, pelletized, etc.

An embodiment of a method 100 for the preparation of LCPCs of the type disclosed herein is depicted in FIG. 1. Referring to FIG. 1, in an embodiment, the method 100 may initiate by contacting of polymer 110 and layered compound 120 to form a mixture via extrusion compounding 130. Extrusion compounding 130 refers to the process of mixing a polymer with one or more additional components wherein the mixing may be carried out using a continuous mixer such as for example a mixer consisting of a short non-intermeshing counter rotating twin screw extruder for mixing/melting the components of the LCPC and a single screw extruder or a gear pump for pumping.

Extrusion compounding 130 may produce a composition in which some of the polymer has been intercalated into the layered compound as depicted in structure 140a. In structure 140a, the polymer 110 is inserted between the platelets of the layered compound 120 such that the inter-layer spacing of the layered compound 120 is expanded but still bear a well-defined spatial relationship to each other. Extrusion compounding 130 may also result in some degree of exfoliation as shown in 140b in which the platelets of the layered compound 120 have been completely separated and the individual layers are distributed throughout the polymer 110. The mixture of layered compound and polymer after having been extrusion compounded is hereinafter referred to as the extruded mixture.

The method 100 for the preparation of the LCPC may then proceed to block 150 wherein the extruded mixture is oriented to produce the LCPC. The LCPC may be oriented using any suitable physical and/or mechanical techniques which change the dimensions of the composites. Generally, orientation of a polymer composition refers to the process whereby directionality (the orientation of molecules relative to each other) is imposed upon the composition. In some embodiments, the composition may be oriented using any suitable physical technique such as stretching, spinning, blowing, or combinations thereof to produce films, fibers, and the like. In an embodiment, the extruded mixture is uniaxially or biaxially oriented. As used herein, the term "biaxial orientation" refers to a process in which a polymeric composition is heated to a temperature at or above its glass-transition temperature but below its crystalline melting point. For example, the extruded mixture may be passed over a first roller (e.g., a chill roller) which solidifies the polymeric composition (i.e. LCPC) into a film. The film may then be oriented by stretching such film in a longitudinal direction and in a transverse direction. The longitudinal orientation is generally accomplished through the use of two sequentially disposed rollers, the second (or fast roller) operating at a speed in relation to the slower roller corresponding to the desired orientation ratio. Longitudinal orientation may alternatively be accomplished through a series of rollers with increasing speeds, sometimes with additional intermediate rollers for temperature control and other functions.

After longitudinal orientation, the film may be cooled, pre-heated and passed into a lateral orientation section. The lateral orientation section may include, for example, a tenter frame mechanism, where the film is stressed in the transverse direction. Annealing and/or additional processing may follow such orientation. Alternatively, the film may be stretched in both directions at same time.

Without wishing to be limited by theory, on cooling the molecular alignment imposed by stretching competes favorably with crystallization, and the drawn polymer molecules condense into a crystalline network with crystalline domains aligned in the direction of the stretching force. Additional disclosure on biaxial film production may be found in U.S. Pat. No. 4,029,876 and U.S. Pat. No. 2,178,104, each of which is incorporated by reference herein in its entirety.

The degree of exfoliation, also termed the "exfoliation effect", of a particular nanocomposite following a processing step (e.g. extrusion compounding, orientation) may be inferred from improvements in mechanical and/or physical properties of articles prepared from the nanocomposite. For example, a nanocomposite material prepared by extrusion compounding a filler material (e.g., layered compound) and a macroscopic material (e.g., polymer) may show an increase in tensile strength of 10% when compared to the tensile strength of the macroscopic material in the absence of the filler material. The nanocomposite is known to comprise some amount, x, of intercalated filler material and some amount y of exfoliated filler material, and the overall degree of exfoliation achieved is designated as z. A nanocomposite prepared by extrusion compounding and orienting as described herein may also show an increase in tensile strength, of 50% when compared to an otherwise similar composition that was not prepared by extrusion compounding and orientation. The nanocomposite material prepared by extrusion compounding and orientation is believed to have a higher degree of exfoliation as evidenced by the larger improvement in one or more physical and/or mechanical properties (i.e., tensile strength). The nanocomposite material prepared by extrusion compounding and orientation may have some amount a of intercalated filler material, and some amount b of exfoliated filler material and the overall degree of exfoliation is designated c wherein b is greater than y, and c is greater than z.

Unless otherwise indicated, the property improvements disclosed are being compared to an otherwise similar composite prepared in the absence of extrusion compounding and orienting.

In an embodiment, an article constructed from an LCPC of the type described herein displays an increased Young's modulus. Young's modulus is a measure of the stiffness of a material and is defined as the ratio of the rate of change of stress with strain. Young's modulus can be determined experimentally from the slope of a stress-strain curve created during tensile tests conducted on a sample of a material, as determined in accordance with ASTM D882. In an embodiment, the article made from the LCPC may exhibit an increase in Young's modulus at yield when compared to a similar article constructed from a polymer lacking the layered compounds of from 5% to 300%, alternatively from 10% to 100%, alternatively from 20% to 50%.

In an embodiment, an article constructed from an LCPC of the type described herein displays an increased tensile strength at yield. The tensile strength at yield is the force per unit area required to yield a material, as determined in accordance with ASTM D882. In an embodiment, the article made from the LCPC may exhibit an increase in tensile strength at yield when compared to a similar article constructed from a polymer lacking the layered compounds of from 5% to 300%, alternatively from 10% to 100%, alternatively from 20% to 50%.

In an embodiment, the article constructed from an LCPC of the type described herein is formed into a film, alternatively a biaxially oriented film. Orientation of a polymer has been described previously. The biaxially oriented film exhibits comparable optical properties when compared to polystyrene films.

In an embodiment, a biaxially oriented film produced from an LCPC of the type disclosed herein has a gloss 20° of from 10 to 90, or from 20 to 80, or from 30 to 70. The gloss of a material is based on the interaction of light with physical characteristics of a surface of the material, more specifically the ability of such a surface to reflect light in a specular direction, as determined in accordance with ASTM D2457. Gloss can be measured by measuring the degree of gloss for example at 20° incident angle (also known as "gloss 20°").

Haze is the cloudy appearance of a material caused by light scattered from within the material or from its surface. The haze of a material can be determined in accordance with ASTM D1003-00 for a haze percentage of equal to or lower than 30%. A material having a haze percentage of greater than 30% can be determined in accordance with ASTM E167. In an embodiment, a biaxially oriented film produced from an LCPC of the type disclosed herein has an increase in the haze percentage when compared to polystyrene films of from 0% to 20%, or from 1% to 10%, or from 2% to 5%.

A biaxially oriented film produced from an LCPC of the type disclosed herein may display a decreased oxygen transmission rate (OTR) when compared to polystyrene films. The OTR is the steady state rate at which oxygen gas permeates through a film at specified conditions of temperature and relative humidity, as determined in accordance with ASTM D3895. OTR may be measured by exposing one side of a film to an oxygen atmosphere. As the oxygen solubilizes into the film and permeates through the material, nitrogen sweeps the opposite side of the film and transports the transmitted oxygen molecules to a coulometric sensor. This value is reported as a transmission rate. When this rate is multiplied by the average thickness of the material, the results are considered a permeability rate. In an embodiment, a biaxially oriented film produced from an LCPC of the type disclosed herein may have a decrease in OTR when compared to polystyrene films of from 1.0% to 99.9%, or from 10.0% to 90.0%, or from 20.0% to 50.0%.

Additionally, a biaxially oriented film produced from an LCPC of the type disclosed herein may have a decreased water vapor transmission rate (WVTR.). WVTR is the steady state rate at which water vapor permeates through a film at specified conditions of temperature and relative humidity, as determined in accordance with ASTM F1249. WVTR may be measured by exposing one side of a film to a dry stream (with low water vapor pressure), and the other side to a wet stream. The partial pressure difference between the two sides of the film creates a driving force for the water vapor to permeate through the film to go from the wet to the dry side. Similar to OTR, the water vapor on the dry side was detected using a sensor and the value is reported as a transmission rate. In an embodiment, a biaxially oriented film produced from an LCPC of the type disclosed herein may have a decrease in WVTR when compared to polystyrene films of from 1.0% to 99.9%, or from 10.0% to 90.0%, or from 20.0% to 50.0%.

The LCPCs of this disclosure may be converted to end-use articles by any suitable method. An example of such conversion includes without limitation a plastics shaping process. Examples of end use articles (made from foamed or unfoamed LCPCs) into which the polymeric blend may be formed include food packaging, office supplies, plastic lumber, replacement lumber, patio decking, structural supports, laminate flooring compositions, polymeric foam substrate; decorative surfaces (i.e. crown molding, etc.) weatherable outdoor materials, point-of-purchase signs and displays, house wares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., toy bricks, blocks), musical instruments, golf club heads, piping, business machines and telephone components, shower heads, door handles, faucet handles, wheel covers, automotive front grilles, and so forth.

EXAMPLES

Example 1

The stretching force of nanocomposites prepared using the methods disclosed herein was compared to the stretching force required for a polymeric material. A source of organoclay (CLOISITE 15A) and two sources of polystyrene (CX5229 and PS535) were used as indicated in Table 3. Hereinafter, polystyrene samples that had not been subjected to organoclays will be referred to as "neat PS." Four samples, designated Samples 1-4, as shown in Table 3, were prepared by melt compounding using a Leistritz ZSW 50 line twin screw. The compounded samples were cast into 40 mil sheets on a mini-sheet line. The sheets were then stretched on a Brückner (Laboratory stretcher manufactured by Brückner, Siegsdorf, Germany) at 140° C. to a 6×6 areal draw ratio at both MD and TD speeds of 30 m/min. The preheating time was set at 60 seconds and the clip temperature was at 100° C.

TABLE 3

| Sample | Polystyrene | Clay |
|---|---|---|
| 1 | CX5229 | n/a |
| 2 | CX5229 | 5% CLOISITE 15A |
| 3 | PS535 | n/a |
| 4 | PS535 | 5% CLOISITE 15A |

Figure 2:
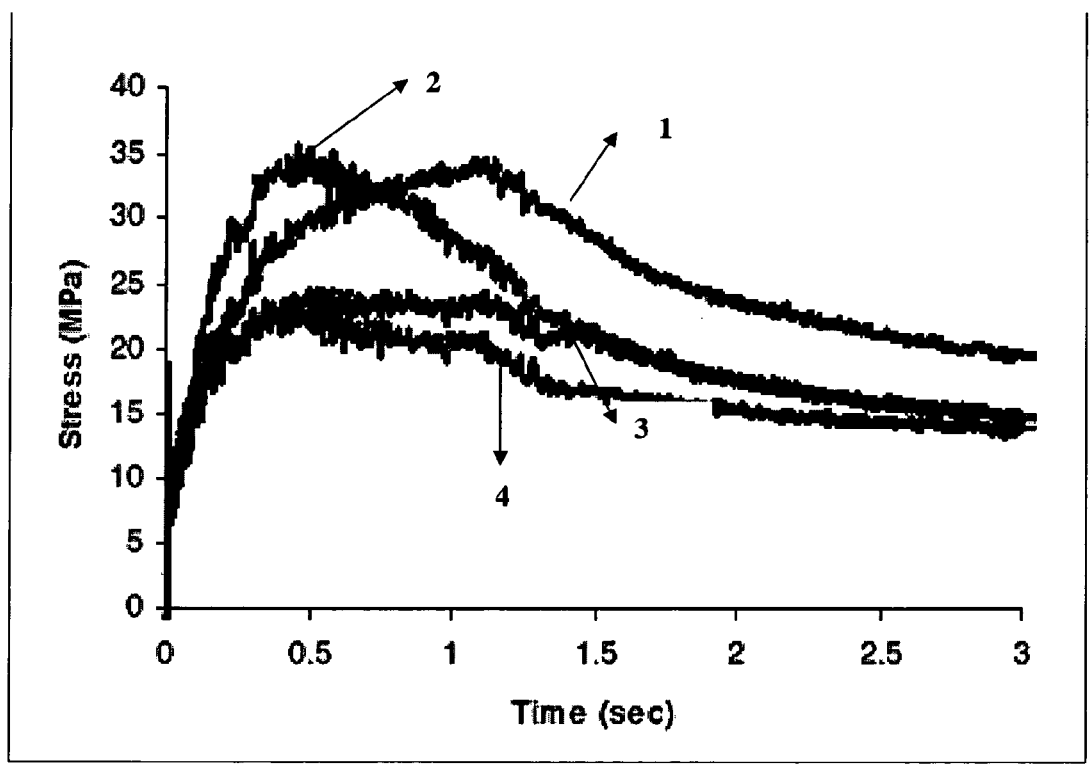
FIG. 2 is a plot of stretching stress in the machine direction as a function of time for the samples from Example 1.

FIG. 2 is a plot of MD stretching force as a function of time for Samples 1-4. Since these films were stretched at a constant rate of 30 m/min, the stretching time could be translated to strain. As shown in FIG. 2, the stretching stress of the nanocomposite samples (Samples 2 and 4) was higher than that of Samples 1 and 3 before they reached yielding points. The higher stretching stress indicated that there were additional hindrances in the nanocomposite to be overcome when compared to neat PS. This additional stretching stress, without wishing to be limited by theory, was believed to orient the clay nanoplatelets and slide the particles resulting in exfoliation of the intercalated clay nanoplatelets. Herein "slide" refers to an approach to achieving exfoliaton of the clay particles. In addition, the trend appears to be more obvious in Sample 2 than in Sample 4, which indicates that the orientation and exfoliation effect should be more significant on Sample 2.

Figure 3:
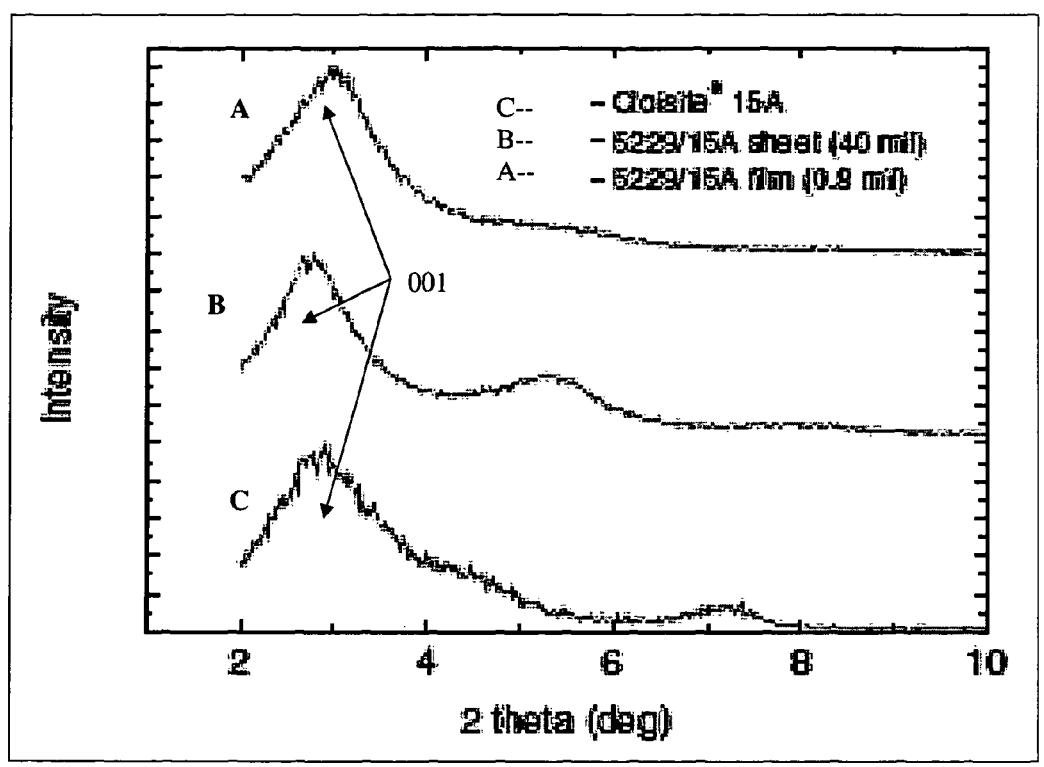
FIGS. 3 and 4 are plots of X-ray diffraction patterns of the samples from Example 1.
Figure 4:
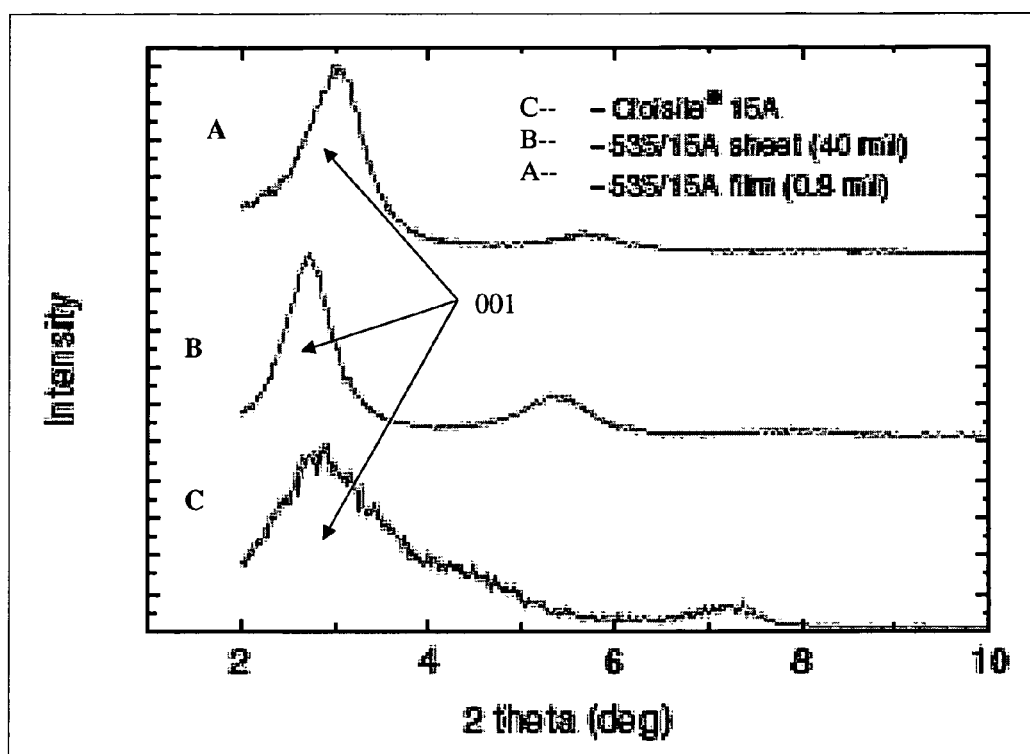

The X-ray diffraction patterns of the nanocomposites were also obtained. FIGS. 3 and 4 are X-ray diffraction patterns of Samples 2 and 4 respectively. As shown in FIGS. 3 and 4, a strong peak was observed at approximately 2.8° for each sample and is referred to as the 001 peak. Both patterns show no observable shifts of the 001 peaks to a lower 2-theta position. Without wishing to be limited by theory, a decrease in the 2-theta position for the 001 peak (shifting of the peaks to the left) would be expected for samples having an increased degree of intercalation. The values obtained suggest that limited intercalation has been achieved during melt compounding of Samples 2 and 4. The limited intercalation will affect the subsequent stretch-slide-exfoliation process which is designed to achieve exfoliation that is directly proportional to the amount of intercalated structure available. Additionally, for both Samples 2 and 4, the 001 peaks shifted slightly to the higher 2-theta position, which indicates that the clay interlayer distance decreased slightly. Without wishing to be limited by theory, this decrease in the clay interlayer distance may be attributed to a thinning effect during stretching. Since the thickness of the samples was reduced from 40 mils to 0.8 mils after stretching, it is expected that the intercalated clay will be compressed which may be reflected in the decrease in the interlayer distance.

Example 2

The mechanical properties of samples from Example 1 were investigated. Young's modulus, tensile strength at yield and elongation at yield for Samples 1-4 were determined in the MD and TD and the results are tabulated in Table 4.

TABLE 4

| Sample | Sample Description | MD | | | TD | | |
|---|---|---|---|---|---|---|---|
| | | Young's modulus (kpsi) | Tensile Strength (Yield, kpsi) | Elongation (Yield, %) | Young's modulus (kpsi) | Tensile Strength (Yield, kpsi) | Elongation (Yield, %) |
| 1 | CX5229 | 493.9 ± 30.4 | 11.1 ± 0.6 | 3.9 ± 0.3 | 524.8 ± 23.2 | 11.4 ± 0.9 | 3.5 ± 0.3 |
| 2 | CX5229/15A | 645.1 ± 30.9 | 11.7 ± 0.6 | 3.1 ± 0.1 | 659.2 ± 52.2 | 12.0 ± 0.6 | 3.2 ± 0.1 |
| | Improvement | +31% | +5% | −21% | +26% | +5% | −9% |
| 3 | PS535 | 524.4 ± 55.7 | 11.7 ± 1.5 | 3.4 ± 0.2 | 518.1 ± 35.3 | 11.3 ± 0.3 | 3.8 ± 0.3 |
| 4 | PS535/15A | 637.5 ± 63.4 | 10.7 ± 0.8 | 3.0 ± 0.1 | 635.9 ± 22.4 | 11.5 ± 0.2 | 3.4 ± 0.3 |
| | Improvement | +22% | −9% | −12% | +23% | +2% | −11% |

Referring to Table 4, the nanocomposite films (Samples 2 and 4) exhibit an increased Young's modulus and tensile strength at yield, as well as reduced elongation at yield in both the MD and TD. Sample 2 (CX5229 based film) showed a larger increase when compared to Sample 4 (PS535 based film), which might be attributable to its higher degree of orientation and exfoliation during stretching, as discussed in Example 1.

Example 3

Figure 5:
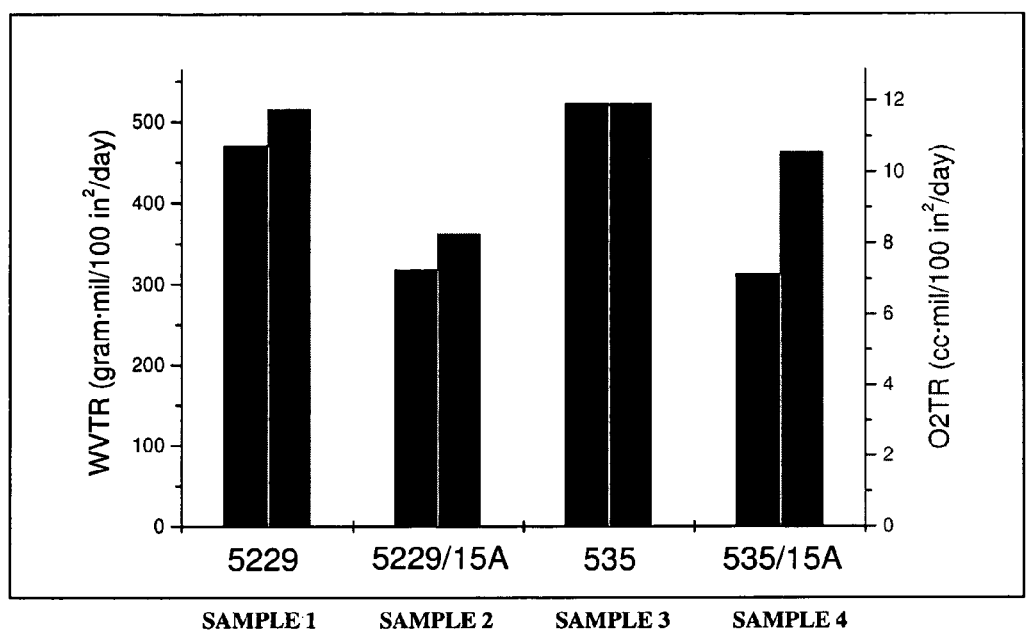
FIG. 5 is a plot of the water vapor transmission rate (WVTR) and oxygen transmission rate (OTR) for the samples from Example 1.

The barrier properties of the biaxially oriented films produced from the samples from Example 1 were investigated. Water vapor transmission rate (WVTR) and oxygen transmission rate (OTR) for Samples 1-4 were determined and the results are plotted in FIG. 5. Referring to FIG. 5, the nanocomposite films (Samples 2 and 4) showed lower permeability to both water vapor and oxygen. Referring to FIG. 5, a comparison of Samples 1 and 2 demonstrates that the incorporation of CLOISITE 15A lowered WVTR by greater than 30% and OTR by almost 30% for CX5229 based films. By comparing Samples 3 and 4, the incorporation of CLOISITE 15A reduced WTR by 40% and OTR by greater than 10% for PS535 based films.

Example 4

The optical properties of the biaxially oriented films produced from the samples from Example 1 were investigated. The haze percentages and the gloss 20° and 60° percentages were determined for Samples 1-4 and the results are tabulated in Table 5 and plotted in FIGS. 6 and 7.

TABLE 5

| Sample | Description | Gloss 20° | Gloss 60° | Haze % |
|---|---|---|---|---|
| 1 | CX5229 | 71.3 | 173.3 | 7.7 |
| 2 | CX5229/15A | 70.5 | 169.8 | 7.7 |
| 3 | PS535 | 65.3 | 162.5 | 0.3 |
| 4 | PS535/15A | 36.7 | 122.1 | 5.4 |

Figure 6:
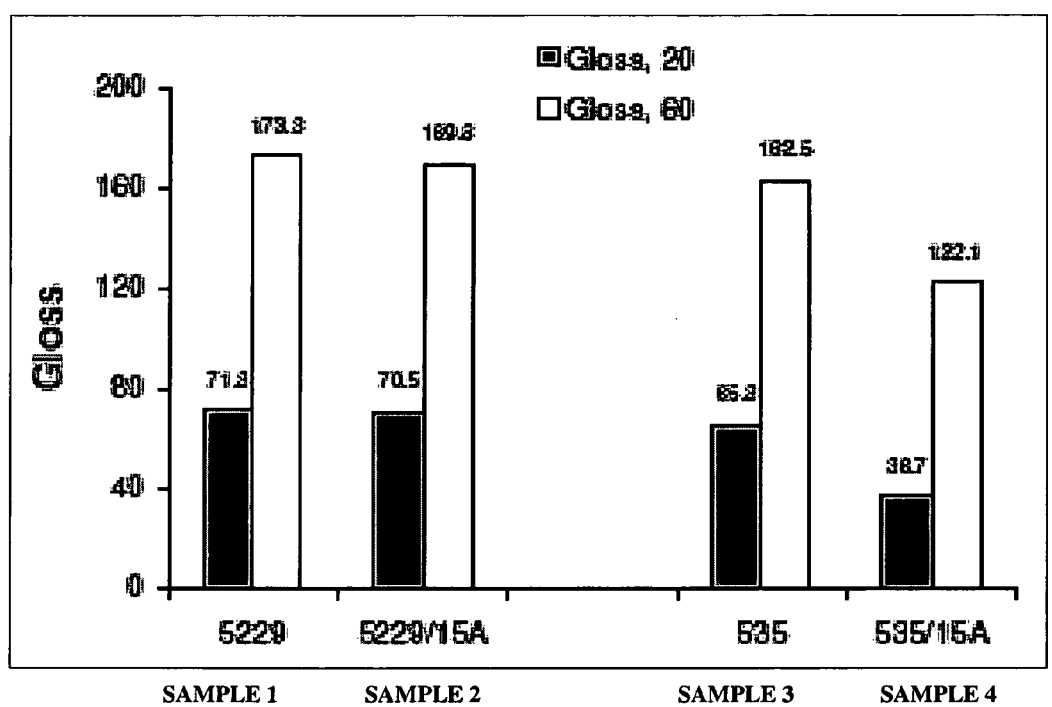
FIG. 6 is a plot of gloss at 20° and 60° for the samples from Example 1.
Figure 7:
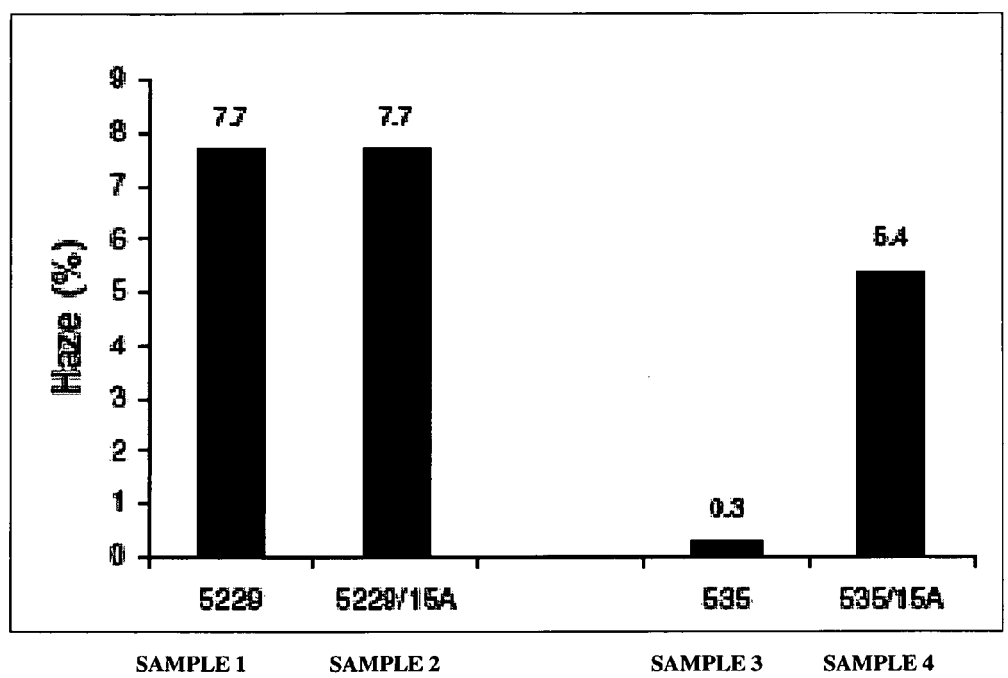
FIG. 7 is a plot of haze percentages for the samples from Example 1.

Referring to Table 5 and FIG. 6, the addition of organoclay to polystyrene resulted in a reduction in the gloss 20° and 60° for both the CX5229 and PS535 based films when compared to the values for the neat PS films. Notably, the reduction in gloss 20° and 60° was larger for the PS535 based films when compared to the CX5229 based films. Referring to Table 5 and FIG. 7, the haze percentage for CX5229 based films with and without CLOISITE 15A showed comparable values of 7.7%. However, for PS535 based films, the incorporation of CLOISITE 15A increased the haze percentage from 0.3% to 5.4%.

Collectively, the results demonstrate a higher degree of sliding-exfoliation occurs in CX5229 based films, which is consistent with the observation that nanocomposites prepared with this material shows a greater degree of improvements in mechanical properties (Example 1), barrier properties (Example 3), and optical properties (Example 4) when compared to neat PS or to PS535 based films.

While embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
   extrusion compounding a styrenic polymer and a layered compound to produce a composite; and
   orienting the composite to produce an oriented composite;
   wherein the layered compound is in the form of a colloid or colloidal dispersion;
   wherein the colloid or colloidal dispersion comprises a dispersed phase and a continuous phase and further wherein the continuous phase is an aqueous solution; and
   wherein the colloid or colloidal dispersion comprises colloidal borates, colloidal aluminates, colloidal phosphates, colloidal sulfates, colloidal sulfides, colloidal halides, or combinations thereof.

2. The method of claim 1 wherein the styrenic polymer is present in an amount of from 50% to 99.9% and the layered compound is present in an amount of from 0.1% to 50% by weight of the composite.

3. The method of claim 1 wherein the styrenic polymer comprises homopolymers, copolymers, terpolymers, thermoplastics, blends thereof, or combinations thereof.

4. The method of claim 1 wherein the styrenic polymer further comprises monomers comprising $C_2$ to $C_{30}$ olefin, ethylenically unsaturated monomers, $C_4$ to $C_{18}$ diolefins, conjugated or nonconjugated dienes, polyenes, vinyl monomers, cyclic olefins, norbornene, nobornadiene, isobutylene, isoprene, vinylbenzocyclobutane, alkyl substituted styrene, ethylidene norbornene, dicyclopentadiene, cyclopentene or combinations thereof.

5. The method of claim 1 wherein the styrenic polymer comprises polystyrene, acrylonitrile butadiene styrene, high impact polystyrene, methyl methacrylate butadiene styrene, or combinations thereof.

6. The method of claim 1 wherein the styrenic polymer further comprises an elastomer.

7. The method of claim 6 wherein the elastomer comprises conjugated diene monomer, 1,3-butadiene, 2-methyl-1,3-butadiene, 2 chloro-1,3 butadiene, 2-methyl-1,3-butadiene, 2 chloro-1,3-butadiene, aliphatic conjugated diene monomer, $C_4$ to $C_9$ dienes butadiene, or combinations thereof.

8. The method of claim 3 wherein the thermoplastic comprises acrylonitrile butadiene styrene, celluloid, cellulose acetate, ethylene vinyl acetate, ethylene vinyl alcohol, fluoroplastics, ionomers, polyacetal, polyacrylates, polyacrylonitrile, polyamide, polyamide-imide, polyaryletherketone, polybutadiene, polybutylene, polybutylene terephthalate, polychlorotrifluoroethylene, polyethylene terephthalate, polycyclohexylene dimethylene terephthalate, polycarbonate, polyhydroxyalkanoates, polyketone, polyester, polyethylene, polyethereetherketone, polyetherimide, polyethersulfone, polyethylenechlorinate, polyimide, polylactic acid, polymethylpentene, polyphenylene oxide, polyphenylene sulfide, polyphthalamide, polypropylene, polysulfone, polyvinyl chloride, polyvinylidene chloride and combinations thereof.

9. The method of claim 1 wherein orienting the composite comprises stretching, spinning, blowing, or combinations thereof in the machine direction, or in the transverse direction, or both.

10. The method of claim 1 wherein the oriented composite has a greater degree of exfoliation when compared to an otherwise similar composite prepared in the absence of extrusion compounding and orientating.

* * * * *